US010214171B2

(12) United States Patent
Maeda et al.

(10) Patent No.: US 10,214,171 B2
(45) Date of Patent: Feb. 26, 2019

(54) PASSENGER PROTECTION APPARATUS

(71) Applicant: HONDA MOTOR CO., LTD., Tokyo (JP)

(72) Inventors: Kento Maeda, Wako (JP); Shinsuke Odai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/593,567

(22) Filed: May 12, 2017

(65) Prior Publication Data

US 2017/0327071 A1 Nov. 16, 2017

(30) Foreign Application Priority Data

May 12, 2016 (JP) .................................. 2016-096172

(51) Int. Cl.
*B60R 21/206* (2011.01)
*B60R 21/00* (2006.01)
*B60R 21/16* (2006.01)

(52) U.S. Cl.
CPC .... *B60R 21/206* (2013.01); *B60R 2021/0051* (2013.01); *B60R 2021/161* (2013.01)

(58) Field of Classification Search
CPC ...................... B60R 21/206; B60R 2021/0051
See application file for complete search history.

(56) References Cited

U.S. PATENT DOCUMENTS

| 5,765,867 | A * | 6/1998 | French | B60R 21/16 280/743.1 |
| 7,766,374 | B2 * | 8/2010 | Abele | B60R 21/206 280/730.1 |
| 2002/0149187 | A1 * | 10/2002 | Holtz | B60R 21/206 280/749 |
| 2004/0124617 | A1 * | 7/2004 | Morita | B60R 21/206 280/732 |
| 2006/0071459 | A1 * | 4/2006 | Hayakawa | B60R 21/206 280/730.1 |
| 2006/0108780 | A1 * | 5/2006 | Hotta | B60R 21/206 280/732 |

(Continued)

FOREIGN PATENT DOCUMENTS

JP 2004-203232 A 7/2004
JP 2005-193817 A 7/2005
(Continued)

OTHER PUBLICATIONS

Office Action dated Apr. 3, 2018, issued in counterpart Japanese Application No. 2016-096172, with English machine translation. (13 pages).

*Primary Examiner* — Darlene P Condra
(74) *Attorney, Agent, or Firm* — Westerman, Hattori, Daniels & Adrian, LLP

(57) ABSTRACT

A passenger protection apparatus allows a bag body of an airbag unit to inflate and expand in a stable manner when an impact is input. The passenger protection apparatus includes an airbag unit that is arranged below an article storage box and that causes a bag body to inflate and expand in a direction of a front seat when an impact is input. The passenger protection apparatus further includes a guide member that covers a gap between a lower end of the article storage box and an adjacent member adjacent to the lower end when bag body inflates and expands.

10 Claims, 6 Drawing Sheets

(56) References Cited

U.S. PATENT DOCUMENTS

2011/0260432 A1* 10/2011 Matsushima ......... B60R 21/201
                                                280/730.2
2016/0096500 A1*  4/2016 Lannen ................ B60R 21/206
                                                280/728.2

FOREIGN PATENT DOCUMENTS

JP    2005-193820 A    7/2005
JP    2012-158276 A    8/2012

* cited by examiner

PASSENGER PROTECTION APPARATUS

CROSS REFERENCES TO RELATED APPLICATIONS

The present application claims priority under 35 U.S.C. § 119 to Japanese Patent Application No. 2016-096172, filed May 12, 2016, entitled "Passenger Protection Apparatus." The contents of this application are incorporated herein by reference in their entirety.

TECHNICAL FIELD

The present disclosure relates to a passenger protection apparatus of a vehicle for protecting a knee portion of a passenger seated on a front seat.

BACKGROUND

A known passenger protection apparatus of a vehicle includes an apparatus provided with a knee air bag apparatus for protecting the knee portion of a passenger by inflating and expanding a bag body from the forward side of the front seat when an impact is input.

An article storage box capable of storing articles such as documents and accessories is attached to a vertical wall member such as an instrument panel in front of the front passenger seat. Therefore, when a knee air bag apparatus is installed at the front passenger seat, the knee air bag apparatus is disposed below the article storage box (see, for example, Japanese Patent Publication No. 2004-203232 and Japanese Patent Publication No. 2005-193817).

In a passenger protection apparatus described in Japanese Patent Publication No. 2004-203232, an article storage box is pivotably mounted downward on the surface of the instrument panel facing the front passenger seat, and a knee air bag apparatus is mounted below the rotating part of the article storage box.

In a passenger protection apparatus described in Japanese Patent Publication No. 2005-193817, an article storage box is attached to the surface of the instrument panel facing the front passenger seat so that the article storage box can slide forward and backward, and a knee air bag apparatus is disposed below the article storage box. In the passenger protection apparatus described in Japanese Patent Publication No. 2005-193817, the article storage box has a box main body having a storage recess portion and a lid portion pivotably attached to the rear side of the box main body (at the side facing the front passenger seat). When the passenger is not seated on the front passenger seat, the article storage box is made to be slidable forward and backward with the entire box main body. When the passenger is seated on the front passenger seat, the box main body is prohibited from sliding, and the lid portion is allowed to be opened and closed.

SUMMARY

However, according to the study by the present inventors, in any of the passenger protection apparatuses explained above, if there is a gap between the lower end of the article storage box and a member close to the lower end of the article storage box, the inflated bag body receiving the gas pressure of the inflator may come into contact with the lower end of the article storage box. Therefore, it is required to further stabilize the inflation and expanding of the bag body of the airbag unit when the impact is input. It is preferable to provide a passenger protection apparatus that can solve such problems.

A passenger protection apparatus according to embodiments adopts the following configuration in order to solve the above-mentioned problem.

That is, the passenger protection apparatus according to one embodiment is used in a vehicle having an article storage box (for example, an article storage box 5 of an embodiment of the present disclosure), which can be opened and closed, attached to a vertical wall member (for example, an instrument panel 2 of an embodiment of the present disclosure) of a vehicle body in front of a front seat, the passenger protection apparatus being installed under the article storage box so as to protect a knee portion of a passenger, the passenger protection apparatus including: an airbag unit (for example, a bag body 11 and an inflator 12 of an embodiment of the present disclosure) causing a bag body (for example, the bag body 11 of an embodiment of the present disclosure) to inflate and expand in the front seat direction when an impact is input; and a guide member (for example, a guide cloth 17 of an embodiment of the present disclosure) covering a gap (for example, a gap D1 of an embodiment of the present disclosure) between a lower end of the article storage box and an adjacent member (for example, an interior member 14 of an embodiment of the present disclosure) adjacent to the lower end of the article storage box (for example, a lower end 21a of an embodiment of the present disclosure) when the bag body inflates and expands.

With the above configuration, when the bag body of the airbag unit starts inflating and expanding at the time of input of an impact, the guide member covers the gap between the lower end of the article storage box and the adjacent member, and the bag body is restricted from directly contacting the lower end of the article storage box at the gap part. Thus, even when the article storage box is provided above the passenger protection apparatus, the bag body more stably expands in the knee direction of passenger.

The article storage box may include a lid portion (for example, a lid portion 21 of an embodiment of the present disclosure) configured to open upon swinging obliquely downward toward the front seat, and the guide member may be configured to expand so as to cover a gap between a lower end of the lid portion and the vertical wall member adjacent to the lower end when the bag body inflates and expands.

In this case, even when the lid portion of the article storage box swings obliquely downward to open on the front seat side, the guide member covers the gap between the lower end of the lid body and the vertical wall member when the bag body of the airbag unit starts inflating and expanding. As a result, the bag body does not come into direct contact with the lower end of the lid body which has swung and displaced downward.

A cover portion (for example, a cover portion 16 of an embodiment of the present disclosure) may be disposed at a side of the bag body adjacent to the front seat, the cover portion, when the bag body inflates and expands, breaking and allowing the bag body to expand in a direction of the front seat, and a breakable portion of the cover portion (for example, a breakable portion 15 of an embodiment of the present disclosure) may be disposed at an upper portion of the cover portion in a vehicle vertical direction so that the cover portion opens downward.

In this case, when the cover portion breaks at the breakable portion on the upper side at the initial stage of inflation and expanding of the bag body, a reaction force that makes the bag body move obliquely upward of the front seat is likely to act on the bag body from the cover portion. As a result, the bag body expands smoothly in front of the knee portion of passenger.

The guide member may be configured to serve also as a restraining member for restraining the bag body in a folded state.

In this case, since the guide member also serves as the restraining member, the number of parts can be reduced as compared with the case where the guide member and the restraining member are provided separately.

The cover portion (for example, the cover portion 16 of an embodiment of the present disclosure) may be disposed at the side of the bag body adjacent to the front seat, the cover portion, when the bag body inflates and expands, breaking and allowing the bag body to expand in the direction of the front seat, the guide member may include a free end expanding when the bag body inflates and expands, and a length between the breakable portion (for example, a breakable portion 15 of an embodiment of the present disclosure) of the cover portion and the free end may be configured to, when the bag body inflates and expands, be longer than a length between the breakable portion and the lower end of the article storage box.

In this case, when the cover portion breaks at the breakable portion upon inflating and expanding of the bag body, the free end of the guide member expands to the position beyond the lower end of the article storage box. Therefore, the gap formed between the portion left as a result of the rupture of the cover portion and the lower end of the article storage box is reliably covered by the guide member, and the bag body can be stably inflated and expanded. In the above explanation of the exemplary embodiment, specific elements with their reference numerals are indicated by using brackets. These specific elements are presented as mere examples in order to facilitate understanding, and thus, should not be interpreted as any limitation to the accompanying claims.

According to one embodiment, the guide member for covering the gap between the lower end of the article storage box and the adjacent member is provided at the time of inflation and expanding of the bag body of the airbag unit, and therefore, the inflating and expanding of the bag body of the airbag unit can be stabilized when an impact is input.

DETAILED DESCRIPTION

Hereinafter, an embodiment of the present disclosure will be described with reference to the drawings. In each figure, an arrow FR pointing forward of the vehicle and an arrow UP pointing upward of the vehicle are shown.

Figure 1:
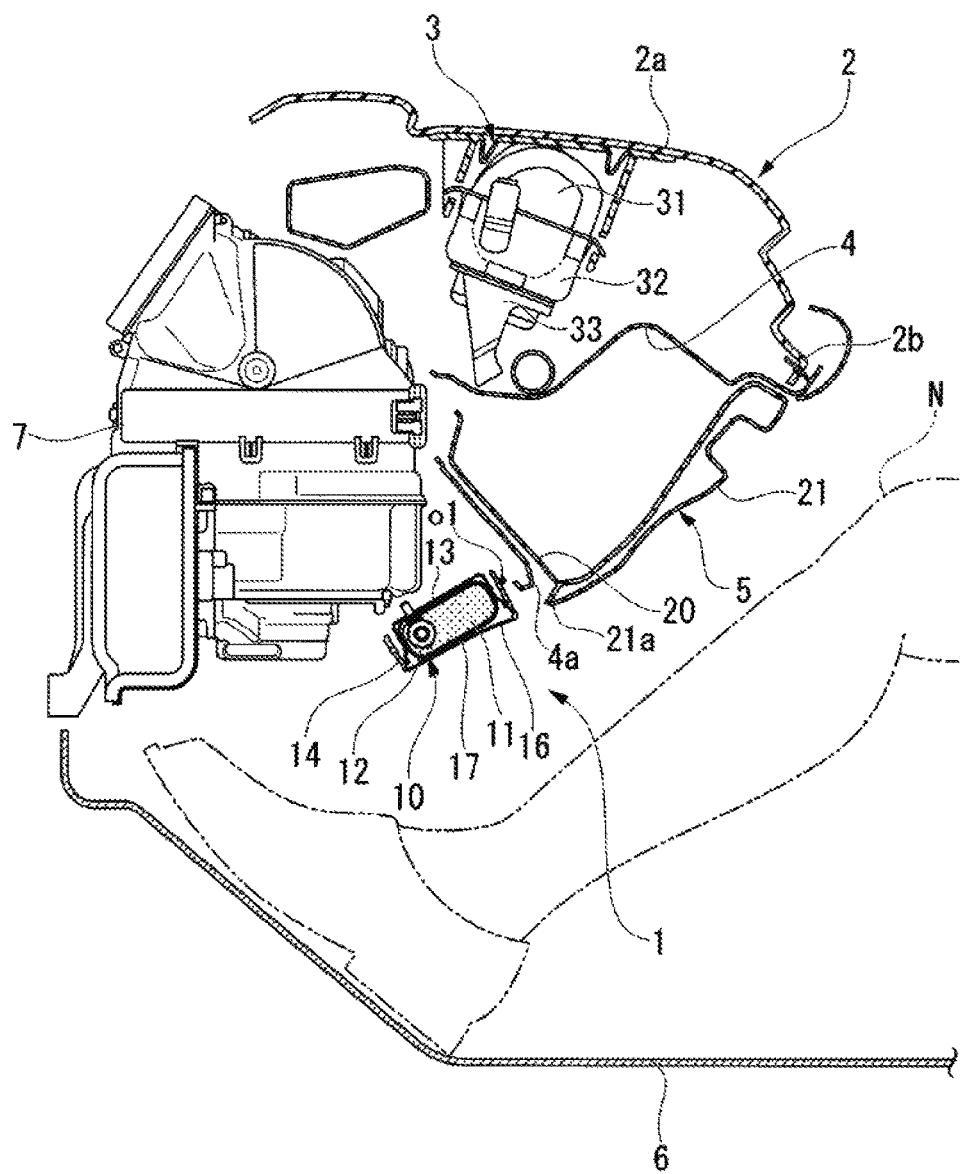
FIG. 1 is a longitudinal sectional view illustrating a front portion of a front passenger seat of a vehicle equipped with a passenger protection apparatus of an embodiment of the present disclosure.

FIG. 1 is a cross sectional view illustrating a front portion of a front passenger seat of a vehicle equipped with a passenger protection apparatus 1 according to this embodiment.

In FIG. 1, reference symbol 2 denotes an instrument panel constituting the main portion of the vertical wall member arranged in front of the front passenger seat (front seat). The instrument panel 2 includes an upper wall portion 2a extending rearward of the vehicle body from the lower end of a windshield glass (not shown) and a vertical wall portion 2b extending from the rear end portion of the upper wall portion 2a in a curved manner toward the lower front side. On the underside of the upper wall portion 2a, a main airbag apparatus 3 for the front passenger seat is provided to restraining the upper body of the passenger who sits on the front passenger seat when an impact is input. A concave portion 4 of which front side is open is provide on the lower edge of the vertical wall portion 2b, and an article storage box 5 is pivotably attached to the concave portion 4.

Below the concave portion 4 of the instrument panel 2, there is arranged a knee air bag apparatus 10 which protects the knee portion N of the passenger who sits on the front passenger seat when an impact is input. In FIG. 1, reference symbol 6 denotes a floor portion in the passenger compartment, and reference symbol 7 denotes an air conditioning unit arranged at the front side of the installation portion of the article storage box 5 and the knee air bag apparatus 10.

The main airbag apparatus 3 for the front passenger seat includes a bag body 31 which inflates and expands upon receiving a gas pressure and an inflator 32 which supplies high pressure gas to the bag body 31 when an impact is input, and the folded bag body 31 as well as the inflator 32 are attached to a fixing member on the vehicle body with a retainer 33. The upper wall portion 2a of the instrument panel 2 is provided with a breakable portion (tear line) (not shown) which breaks when the bag body 31 inflates and expands upon receiving a gas pressure from the inflator 32. The bag body 31 which pushes open the upper wall portion 2a by breaking the breakable portion comes into contact with the inner surface of the windshield glass and changes its direction and unfolds toward the seated person who sits on the front passenger seat.

The article storage box 5 includes a box main body unit 20 of which upper side is open and which can store articles therein, a lid portion 21 integrally formed with the box main body unit 20 at the rear side of the box main body unit 20 (a side facing the front passenger seat). The box main body unit 20 and the lid portion 21 are pivotably supported by the instrument panel 2. The box main body unit 20 and the lid portion 21 can rotate around the pivoting axis o1 positioned below the concave portion 4 of the instrument panel 2, and the lid portion 21 is configured to allow the concave portion 4 to be open toward the rear upper side by swinging obliquely downward toward the front passenger seat from the closed state where the concave portion 4 is closed. In this state, the article storage box 5 allows articles to be put in and taken out from the box main body unit 20.

Figure 2:
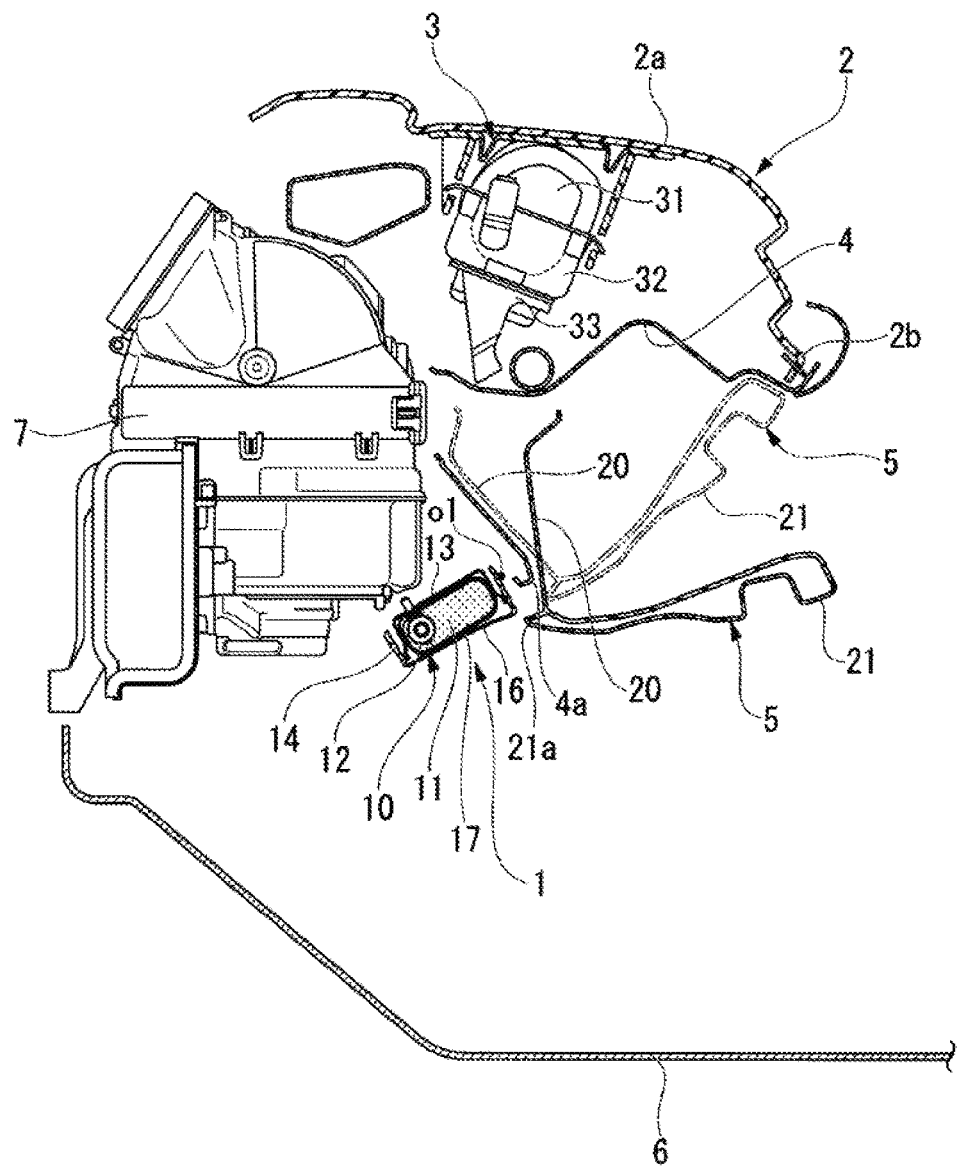
FIG. 2 is a longitudinal sectional view similar to FIG. 1 when the article storage box of the vehicle equipped with a passenger protection apparatus according to an embodiment of the present disclosure is open.

FIG. 2 is a sectional view similar to FIG. 1 and illustrating the state in which the article storage box 5 rotates around the pivoting axis o1 to be opened.

In the article storage box 5, as shown in FIG. 2, when the upper side is opened, the lower end 21a of the lid portion 21 moves obliquely downward to the front passenger seat.

Figure 3:
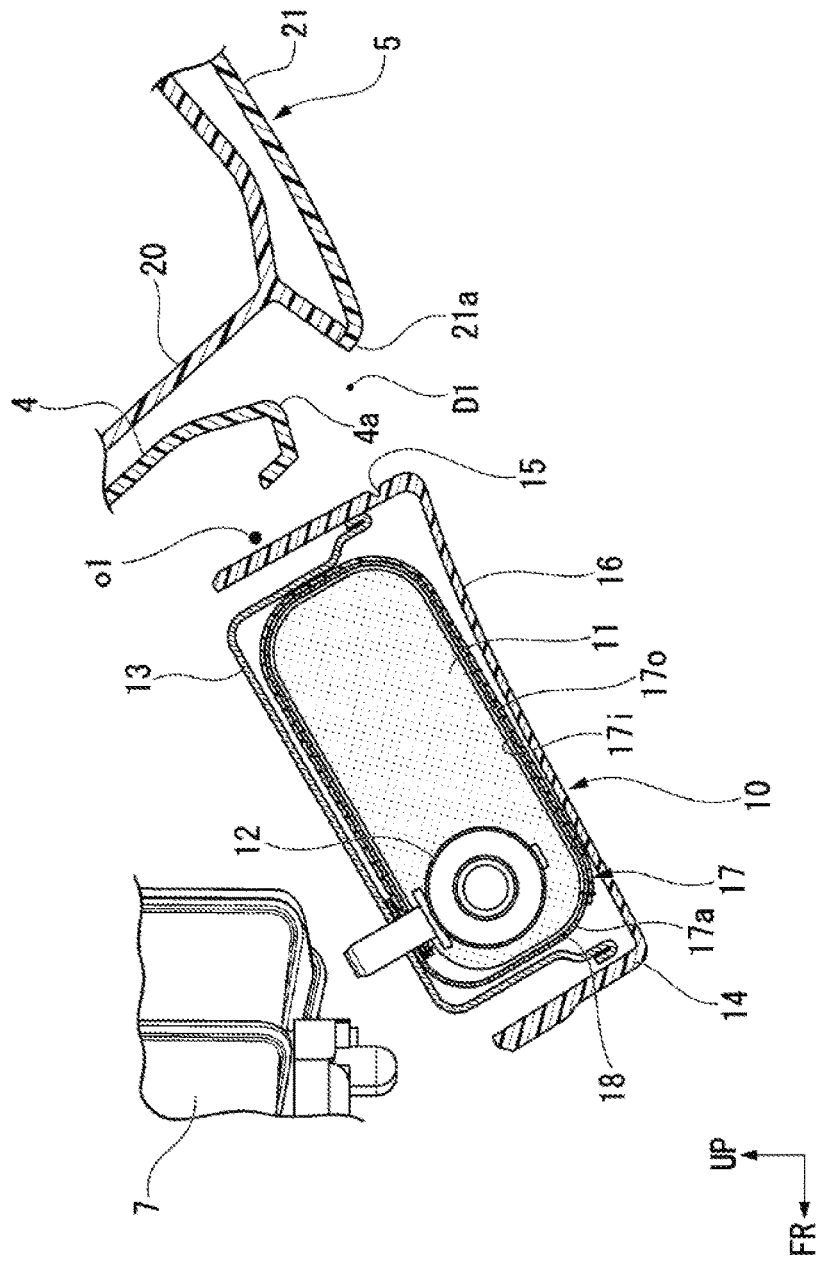
FIG. 3 is an enlarged sectional view illustrating a portion of FIG. 1 of a vehicle equipped with a passenger protection apparatus according to an embodiment of the present disclosure.
Figure 4:
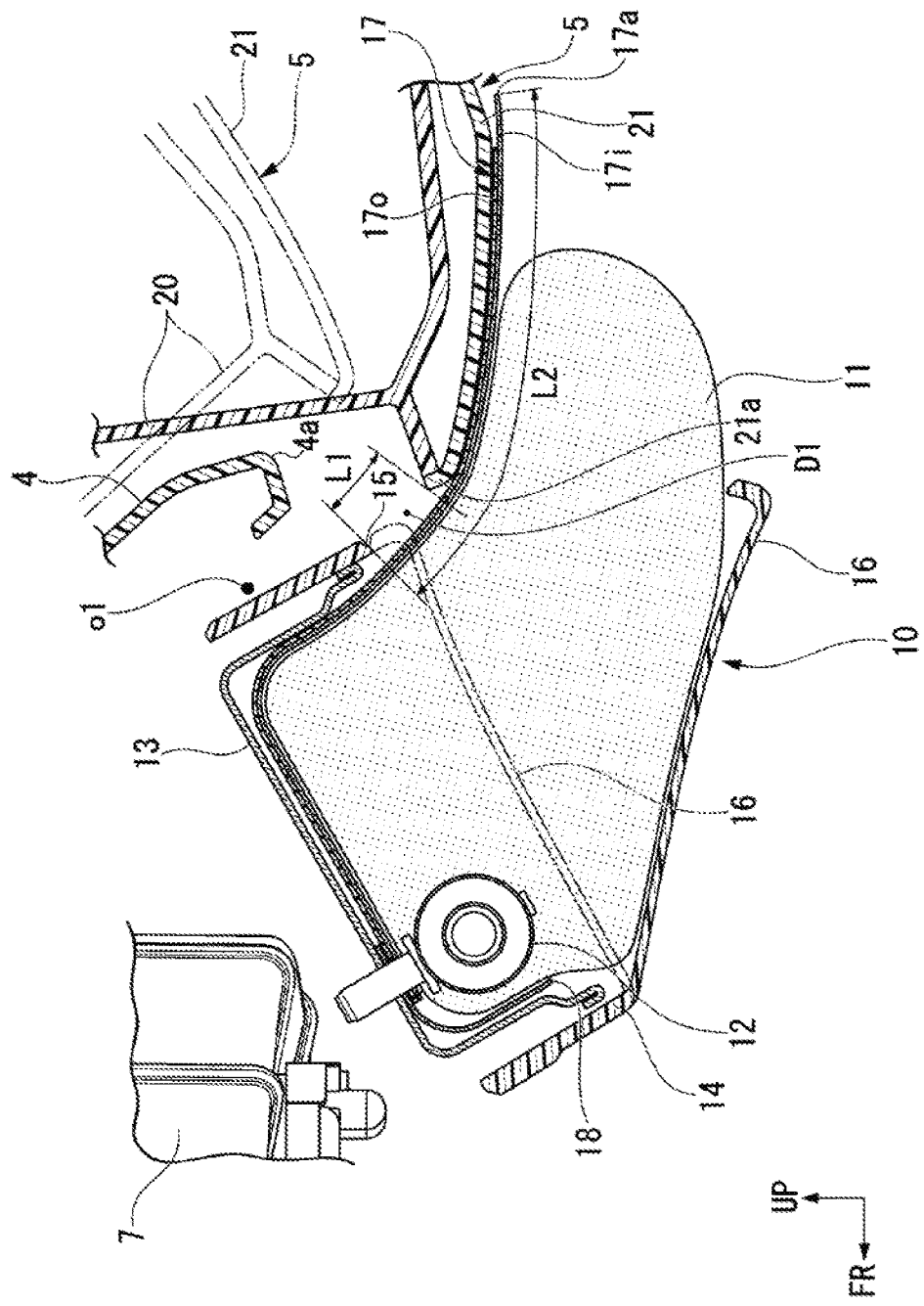
FIG. 4 is a sectional view similar to FIG. 3 at the initial stage of expanding of the bag body of the vehicle equipped with a passenger protection apparatus according to an embodiment of the present disclosure.

FIG. 3 is an enlarged sectional view showing a part of the article storage box 5 and the knee air bag apparatus 10 of FIG. 1. FIG. 4 is a sectional view similar to FIG. 4 when the article storage box 5 is opened and the knee air bag apparatus 10 starts operation.

As shown in FIG. 3 and FIG. 4, the knee air bag apparatus 10 includes a bag body 11 which inflates and expands upon receiving a gas pressure, an inflator 12 which supplies a high pressure gas to the bag body 11 when an impact is input, and an accommodation case 13 which is open in the direction of the front passenger seat and which accommodates the inflator 12 and the bag body 11 folded in the inside of the accommodation case 13. The accommodation case 13 as well as the inflator 12 are attached to a fixing member (not shown) on the vehicle body.

In the present embodiment, the bag body 11 and the inflator 12 constitute the airbag unit of the knee air bag apparatus 10.

At the bag body 11 folded in the accommodation case 13, an interior member 14 made of resin is provided to face the front passenger seat. This interior member 14 may be a member integrally made with the instrument panel 2 or may be a member made separately from the instrument panel 2. The interior member 14 has a breakable portion 15 (tear line) formed substantially below a lower edge portion 4a of the concave portion 4 to extend at least in the vehicle width direction. When the bag body 11 inflates when an impact is input, the breakable portion 15 is broken upon receiving the expanding pressure of the bag body 11. An area below the breakable portion 15 of the interior member 14 is a cover portion 16 covering the side of the bag body 11 adjacent to the front passenger seat, and as shown in FIG. 4, the cover portion is opened downward when the breakable portion 15 is broken. When the cover portion 16 is opened downward, the cover portion allows the expanding of the bag body 11 in the front passenger seat direction. The breakable portion 15 is provided at the upper part of the cover portion 16 in the vertical direction of the vehicle.

By the way, the bag body 11 in the accommodation case 13 in the folded state is surrounded by and covered with a guide cloth 17, i.e., a guide member. The guide cloth 17 covers the front and rear surfaces and the upper and lower surfaces of the folded bag body 11, and has a breakable portion 18 made of a sewn portion or the like at a portion corresponding to the lower surface of the bag body 11.

When the bag body 11 inflates, the breakable portion 18 of the guide cloth 17 breaks, so that the portion covering the lower surface and the rear surface of the bag body 11 jumps upward, and the guide cloth expands. The guide cloth 17 expands to the upper rear side of the vehicle in such a manner that a portion adjacent to the breakable portion 18 serves as a free end 17a. In the case of the present embodiment, the guide cloth 17 includes a flexible interior cloth 17i made of nonwoven cloth and the like and an exterior cloth 17o integrally attached to the external surface of the interior cloth 17i and having a high frictional coefficient and capable of easily maintaining a contact state with a lower end of the article storage box 5 when the exterior cloth comes into contact with the lower end of the article storage box 5.

When the bag body 11 inflates and expands, the guide cloth 17 can expand so as to cover a gap D1 between the lower end of the article storage box 5 (lower end 21a of the lid portion 21) and the end portion where the cover portion 16 of the interior member 14 is broken (the breakable portion 15). The guide cloth 17 functions as a restraining member for restraining the bag body 11 in the folded state when the bag body 11 does not inflate and expand (when the knee air bag apparatus 10 is in an inactive state).

More specifically, the length of the guide cloth 17 in the expanded state is configured as follows.

As shown in FIG. 4, the guide cloth 17 is configured so that a length L2 between the breakable portion 15 of the cover portion 16 of the interior member 14 and the free end 17a is longer than a length L1 between the breakable portion 15 and the lower end 21a of the lid portion 21 of the article storage box 5 (the lower end 21a of the lid portion 21 when the lid portion 21 is opened most largely).

The passenger protection apparatus 1 according to the present embodiment has the above-described configuration, and therefore, when the bag body 11 of the knee air bag apparatus 10 starts to inflate and expand when an impact is input into the vehicle, as shown in FIG. 4, the guide cloth 17 expands to the front upper side so as to cover the gap D1 between the lower end 21a of the article storage box 5 and the member adjacent to the lower end 21a (interior member 14). Therefore, not only when the lid portion 21 of the article storage box 5 is not swung and displaced downwards but also when the lid portion 21 is swung and displaced downwards, the bag body 11 does not come into direct contact with the lower end 21a of the article storage box 5 in the portion of the gap D1.

Figure 5:
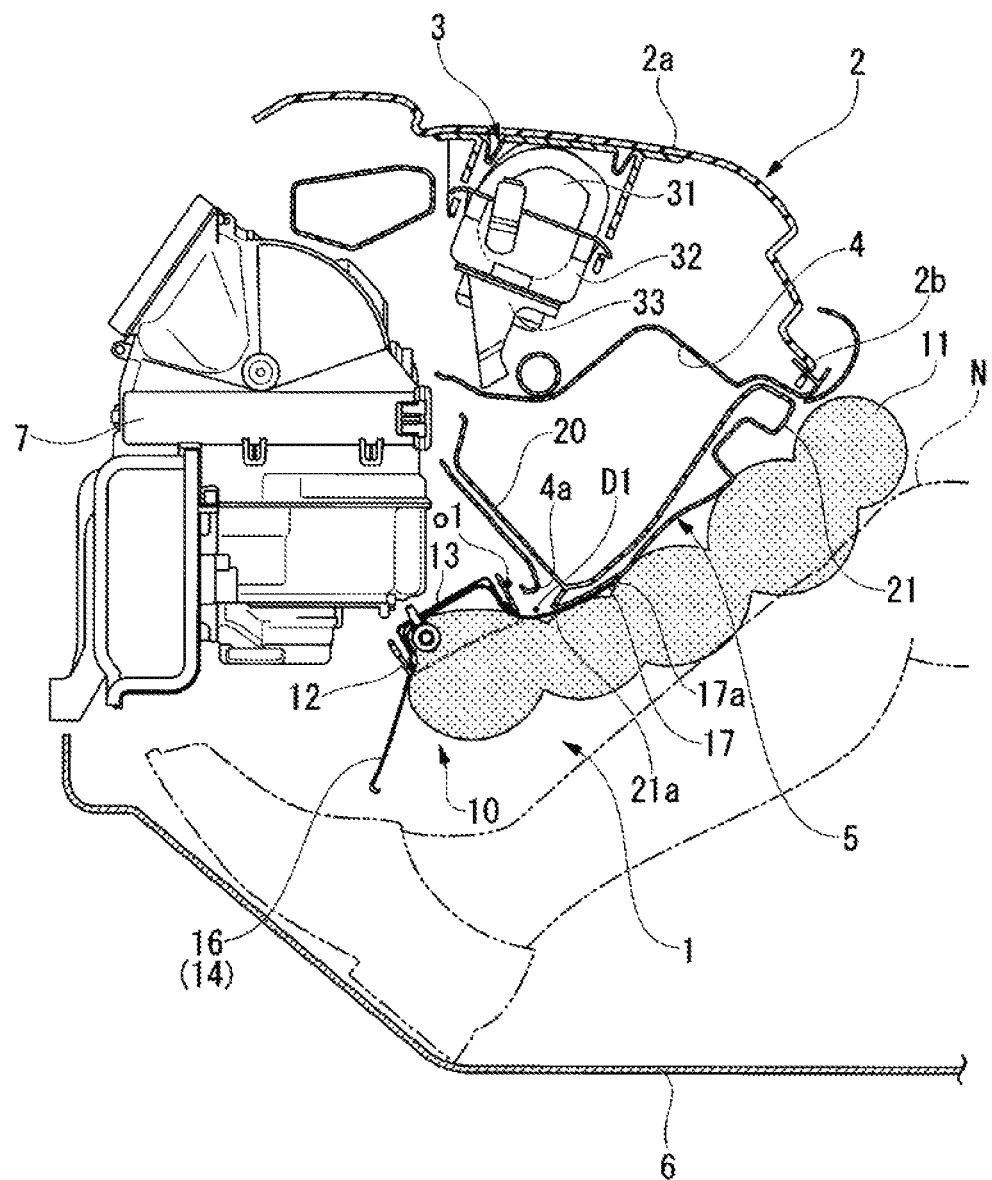
FIG. 5 is a sectional view similar to FIG. 1 in a latter stage of expanding of the bag body of the vehicle equipped with the passenger protection apparatus of an embodiment of the present disclosure.

FIG. 5 shows a cross section similar to FIG. 1 in the latter stage of the expanding of the bag body 11.

As described above, the guide cloth 17 restricts the bag body 11 from directly coming into contact with the lower end 21a of the article storage box 5 in the initial stage of the expanding of the bag body 11, so that, as shown in FIG. 5, the bag body 11 stably unfolds in the direction of the knee portion N of the passenger who is sitting on the front passenger seat.

As described above, the passenger protection apparatus 1 according to the present embodiment includes the guide cloth 17 that covers the gap D1 between the lower end 21a of the article storage box 5 and the member adjacent to the lower end 21a (interior member 14) when the bag body 11 of the knee air bag apparatus 10 inflates and expands, so that the inflating and expanding of the bag body 11 can be stabilized when an impact is input.

In particular, even though the passenger protection apparatus 1 according to the present embodiment employs such structure that the lid portion 21 of the article storage box 5 opens by swinging obliquely downward toward the front passenger seat, the guide cloth 17 is configured to be able to expand so as to cover the gap D1 between the lower end 21a of the lid portion 21 displaced downward and the end portion of the interior member 14 when the bag body 11 inflates and expands, so that the bag body 11 of the knee air bag apparatus 10 can inflate and expand in a more stable manner.

The present embodiment employs such structure that the lid portion 21 of the article storage box 5 opens upon rotating diagonally downward toward the front passenger seat, and therefore, the opening and closing operation of the article storage box 5 is stabilized, and this makes it easy to put an article in or take an article out of the article storage box 5.

In the passenger protection apparatus 1 according to the present embodiment, the cover portion 16 disposed at the bag body 11 so as to face the front passenger seat has the breakable portion 15 at the upper portion in the vehicle vertical direction, so that the cover portion 16 opens downward with the lower end thereof being the pivot point when the bag body 11 inflates and expands. Therefore, in the initial stage of the inflating and expanding of the bag body 11, a reaction force for causing the bag body 11 to move obliquely upward toward the front passenger seat from the cover portion 16, which tries to open downward, can be easily applied to the bag body 11. Therefore, by employing this configuration, the bag body 11 smoothly expands to the space in front of the knee portion N of the passenger.

Furthermore, in the passenger protection apparatus 1 according to the present embodiment, the breakable portion 15 is arranged at upper portion of the cover portion 16, and the lid portion 21 of the article storage box 5 arranged above the cover portion 16 protrudes toward the front passenger seat from the cover portion 16. Accordingly, the breakable portion 15 for breaking the cover portion 16 is hard to see from the passenger who sits on the driver's seat and the front passenger seat. Therefore, when this configuration is adopted, the appearance of the passenger compartment can be enhanced.

In the passenger protection apparatus 1 according to the present embodiment, when the bag body 11 inflates and expands, the guide cloth 17 covering the gap D1 is configured to also serve as a restraining member for restraining the bag body 11 in the folded state, so that the number of components of the passenger protection apparatus 1 according to the present embodiment is less than an apparatus in which the guide cloth 17 and the restraining member are provided separately. Therefore, when this configuration is adopted, the production cost can be reduced.

In the case of the passenger protection apparatus 1 according to the present embodiment, the guide cloth 17 has the free end 17a that expands when the bag body 11 inflates and expands, and when the bag body 11 inflates and expands, the length L2 between the breakable portion 15 of the cover portion 16 and the free end 17a of the guide cloth 17 is longer than the length L1 between the breakable portion 15 and the lower end 21a of the article storage box 5. Therefore, when the cover portion 16 is broken at the breakable portion 15 when the bag body 11 inflates and expands, the gap D1 formed between a portion remaining in the interior member 14 as a result of breaking at the breakable portion 15 and the lower end 21a of the article storage box 5 is reliably closed by the guide cloth 17. Therefore, when this configuration is employed, the bag body 11 can inflate and expand in a more stable manner.

The present invention is not limited to the above embodiment, and various design changes may be made without departing from the gist of the present invention. For example, in the above embodiment, the guide cloth 17 is used as an example of a guide member that expands when the bag body inflates and expands, but the guide member may be made of a material other than the cloth as long as the guide member is a flexible member.

Figure 6:
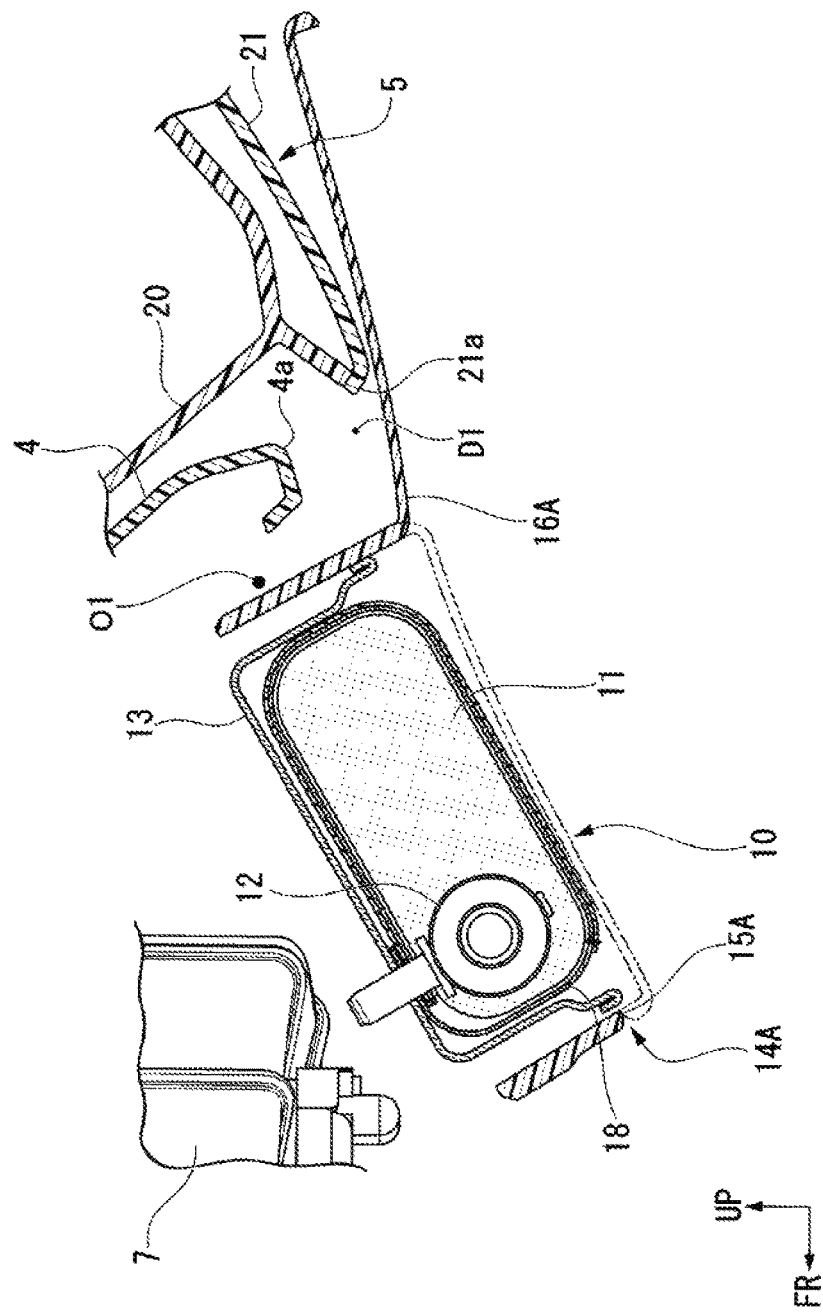
FIG. 6 is a sectional view similar to FIG. 3 of the vehicle equipped with a passenger protection apparatus according to another embodiment of the present disclosure.

In the above embodiment, the guide member is made of a restraining member that restrains the bag body in the folded state, but as shown in another embodiment in FIG. 6, the guide member may be made of a member other than the restraining member.

In the another embodiment shown in FIG. 6, the guide member is constituted by a cover portion 16A of the interior member 14A covering the front passenger seat-side of the bag body 11 of the knee air bag apparatus 10. In the another embodiment shown in FIG. 6, a breakable portion 15A of the cover portion 16A is provided at the lower portion of the cover portion 16A in the vehicle vertical direction, and when the bag body 11 inflates and expands, the cover portion 16A opens upward so as to cover the gap D1. As a result, when the bag body 11 inflates and expands, the bag body 11 is restricted by the cover portion 16A from directly coming into contact with the lower end of the storage box 5. In FIG. 6, the same portions as those shown in the embodiment shown in FIGS. 1 to 5 are denoted with the same reference numerals.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A passenger protection apparatus used in a vehicle having an article storage box, which can be opened and closed and which is attached to a vertical wall member of a vehicle body in front of a front seat, the passenger protection apparatus being installed under the article storage box so as to protect a knee portion of a passenger, the passenger protection apparatus comprising:
an airbag unit including a bag body and causing the bag body to inflate and expand toward the front seat when an impact is input;
a guide member configured to cover a gap between a lower end of the article storage box and an adjacent member adjacent to the lower end of the article storage box when the bag body inflates and expands; and
a case including a cover portion and configured to contain the guide member and the bag body in a folded state therein,
wherein the guide member is configured to surround an entirety of an outer circumference of the folded bag body in the case,
wherein the airbag unit includes an inflator, and the inflator is disposed inside the bag body.

2. The passenger protection apparatus according to claim 1, wherein the article storage box includes a lid portion configured to open upon swinging obliquely downward toward the front seat, and
the guide member is configured to expand so as to cover a gap between a lower end of the lid portion and the vertical wall member adjacent to the lower end of the lid portion when the bag body inflates and expands.

3. The passenger protection apparatus according to claim 2, wherein the guide member is configured to expand from the airbag unit toward the front seat to cover the gap when the bag body inflates and expands so as to prevent the expanded bag body from contacting the lower end of the lid portion.

4. The passenger protection apparatus according to claim 1, wherein the cover portion is disposed on a side of the bag body adjacent to the front seat, and when the bag body inflates and expands, the cover portion breaks at a breakable portion thereof to allow the bag body to expand toward the front seat, and
the breakable portion of the cover portion is disposed at an upper portion of the cover portion in a vehicle vertical direction so that the cover portion opens downward.

5. The passenger protection apparatus according to claim 1, wherein the guide member is also configured to serve as a restraining member for restraining the bag body in a folded state.

6. The passenger protection apparatus according to claim 1, wherein the cover portion is disposed on a side of the bag body adjacent to the front seat, and when the bag body inflates and expands, the cover portion breaks at a breakable portion thereof to allow the bag body to expand toward the front seat, the guide member includes a free end expanding when the bag body inflates and expands, and when the bag body inflates and expands, a length between the breakable portion of the cover portion and the free end is configured to be longer than a length between the breakable portion and the lower end of the article storage box.

7. The passenger protection apparatus according to claim 1, wherein the guide member is configured to expand from the airbag unit toward the front seat to cover the gap when the bag body inflates and expands so as to prevent the expanded bag body from contacting the lower end of the article storage box.

8. The passenger protection apparatus according to claim 1, wherein the guide member is configured to surround the bag body when the bag body is folded and stored in the airbag unit.

9. A vehicle comprising the passenger protection apparatus according to claim 1.

10. The passenger protection apparatus according to claim 1, wherein the guide member includes a breakable portion.

* * * * *